INVENTOR.
CLARENCE A. SHERMAN
BY
Ralph R. Tweedle
ATTORNEY.

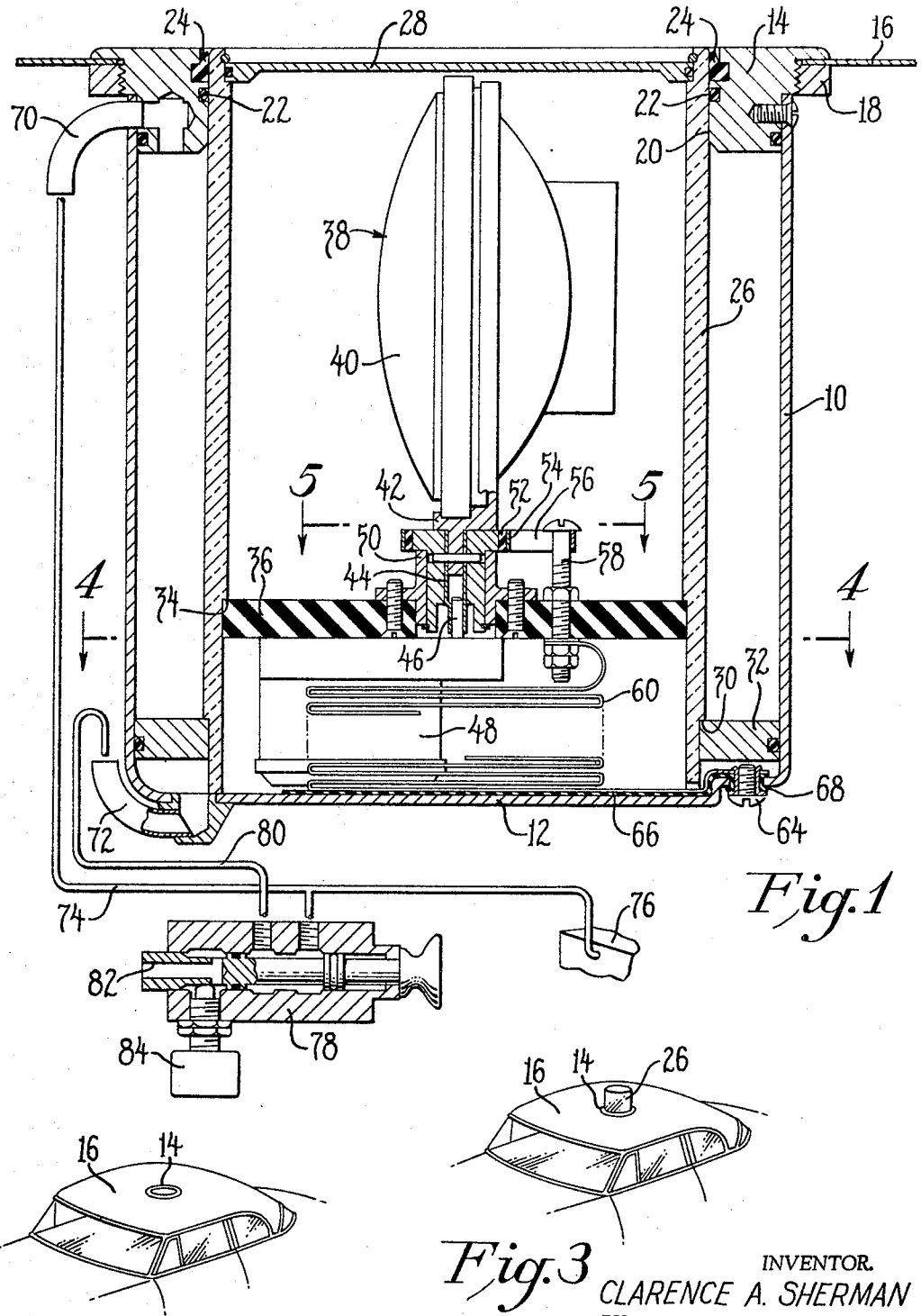

3,264,607
CONCEALED EMERGENCY BEACON

Clarence A. Sherman, Detroit, Mich., assignor to Benton Corporation, Ferndale, Mich., a corporation of Michigan
Filed Sept. 24, 1962, Ser. No. 225,479
7 Claims. (Cl. 340—87)

This invention relates to signal lights and more particularly to emergency warning beacons such as are installed customarily on police, fire, ambulance, repair and other public service vehicles.

The invention is particularly applicable to warning beacons for police vehicles. Such beacons are best placed on the roof the car for maximum visibility in use but they present the drawback that, when not in use, they form a conspicuous identification of the police vehicle and handicap law enforcement operations when freedom from identification is necessary.

It is an object of the present invention to provide an improved emergency warning beacon which may be installed on the roof of a vehicle and which is arranged to disappear flush with the top of the roof when not in use.

The invention embraces a warning beacon mounted within a vertical transparent cylinder which in turn is arranged to be raised and lowered so as to either project from the roof of a vehicle or to nest within a short vertical housing suspended beneath the roof. Reciprocating motor means, preferably a fluid operated piston arrangement, is provided for shifting the beacon between operating and concealed positions under the control of a remote valve.

Further objects and advantages of the present invention will be apparent from the following description, reference being had to the accompanying drawing wherein a preferred form of the present invention is illustrated.

In the drawings:

FIGURE 1 is a combined vertical cross section and circuit diagram of a warning beacon embodying a preferred form of the present invention.

FIGURE 2 is a fragmentary view of a vehicle showing the warning beacon in the concealed position.

FIGURE 3 is a corresponding view showing the warning light in operating position.

Figure 4:
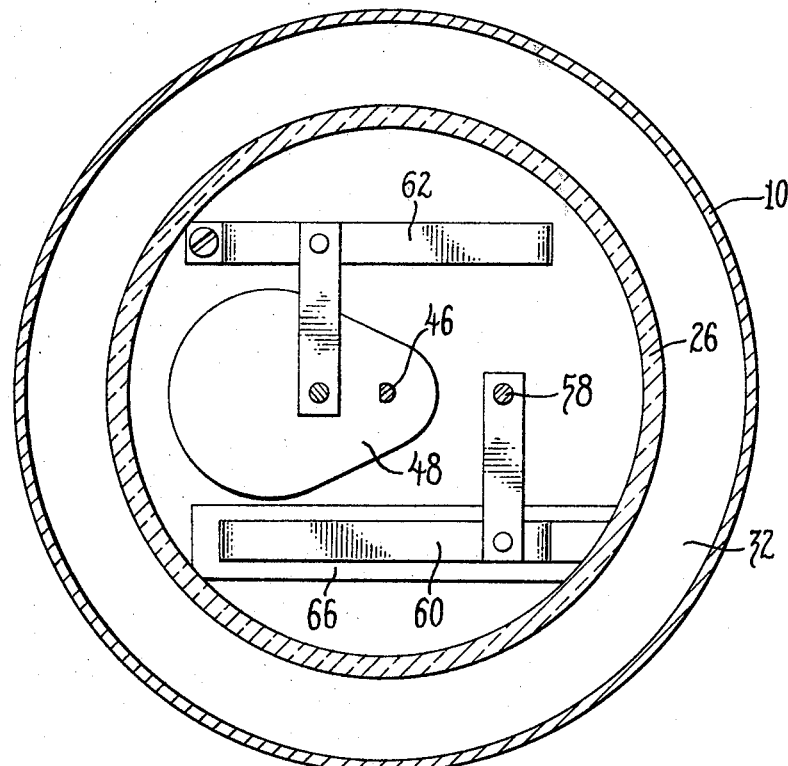
FIGURE 4 is a transverse sectional view taken on line 4—4 of FIGURE 1.
Figure 5:
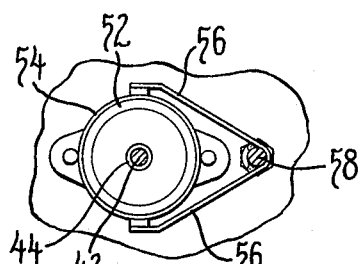
FIGURE 5 is a fragmentary sectional view taken on line 5—5 of FIGURE 1.

As illustrated in FIGURE 1 the warning lamp of the present invention comprises a cup shaped cylindrical housing 10 having a closed bottom indicated at 12 and an annular flange 14 at the top. The flange 14 is mounted in a circular opening in the roof 16 of the vehicle by means of a clamp ring 18. The flange 14 also projects radially inward to provide a shoulder and a vertical bore 20 provided with sliding seals 22 and 24.

Slidably mounted within the bore 20 is a transparent vertical cylinder 26 which may be made of glass, clear plastic or other suitable transparent material. The top of the cylinder 26 is closed by a solid diaphragm 28 rigidly secured and sealed to the sleeve 26 by cement or other retaining means.

At its lower end the cylinder 26 has a shoulder 30 against which is fastened an annular piston 32. The interior of the cylinder is provided with a shoulder 34 against which is securely mounted a bulkhead 36 preferably formed of insulating material.

The bulkhead 36 froms the mounting base for a rotating warning beacon generally indicated at 38. The beacon may be conventional construction comprising a sealed beam lamp 40 mounted on a rotary stem 42 which in turn carries a central driving tube 44 the lower end of which is non-circular to engage with the output shaft 46 of a combined motor and reduction gear 48. The stem 42 is journaled in a bearing sleeve 50, screwed to the bulkhead 36 and also carries, on an insulation ring 52, a conducting slip ring 54 which is wired to one terminal of the lamp 40. Ring 54 is contacted by brushes 56 mounted on a terminal screw 58 secured on the bulk head 36.

At its lower end the screw 58 is in electrical contact with a combined conductor and rotation inhibitor 60. This may take the form of a pleated ribbon 60 of phosphor bronze arranged to expand and contract vertically as the cylinder 26 is raised and lowered. One end of the ribbon 60 is secured to a live terminal 64 and is insulated from the housing 10 by a strip of insulation 66 and an insulating sleeve 68.

The stem 42, bearing 50 shaft and housing of motor 48 are grounded to the metallic housing 10, which in turn is grounded to the roof 16 by means of a second pleated ribbon conductor 62. This lies on the opposite side of motor 48 (see FIGURE 4) and aids the ribbon 60 in preventing rotation of the cylinder 26.

Figure 6:
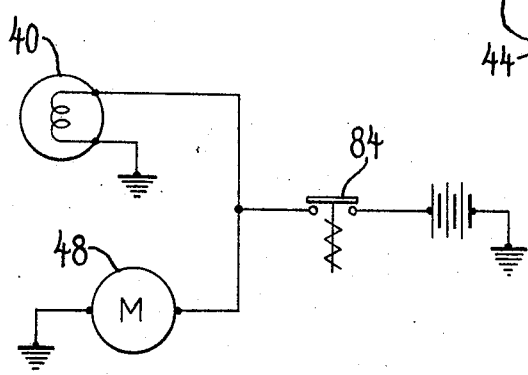
FIGURE 6 is an electrical circuit diagram showing the wiring to the electrical components of the invention.

The fluid connection ports to the top and bottom areas of the housing 10 are provided at 70 and 72 respectively. The conduit 74 connects the port 70 with the intake manifold 76 of the engine or with any other suitable source of negative or positive pressure. Conduit 74 has a branch extending to a manual valve 78 which is shiftable to connect the conduit 74 with another conduit 80 leading to the bottom port 72 as shown in FIGURE 1. When shifted to the right the spool valve 78 blocks connection between conduits 72 and 74 and establishes an atmospheric connection to conduit 80 through a central port 82. The valve 78 preferably has an electric switch 84 mounted thereto and operated by a cam surface on the valve spool so as to turn the switch on whenever the valve spool is pulled to the right in FIGURE 1 to admit atmospheric pressure to the lower terminal 72. The switch 84 is connected by a simple circuit, as illustrated in FIGURE 6, from the car battery to the motor 48 and the lamp 40. With the device in the position shown in FIGURE 1 it will be seen that the cylinder 26 with its bulkheads 36 and 28 and its piston 32 form a differential piston slidable within the internal diameter of housing 10 and within the bore 20. With valve 78 pushed in as shown in FIGURE 1 and with the engine running vacuum from manifold 76 exhausts the air from beneath the entire circular area represented by annular piston 32 cylinder 26 and bulkhead 28. The differential area above annular piston 32 is also exposed to negative pressure from manifold 76 through its permanent connection thereto by conduit 74. Thus atmospheric pressure acting over the top of the bulkhead 28 holds the cylinder assembly in its lowermost position as shown in FIGURE 2. The vehicle is thus not different in external appearance from a distance from a conventional vehicle.

When the valve 78 has its plunger pulled out to admit atmospheric pressure to terminal 72, the reduced pressure existing above piston 32 causes piston 32 and sleeve 26 to rise to the position illustrated in FIGURE 3. At the same time the switch 84 energizes motor 48 and lamp 40 to produce the usual rotating emergency beacon signal. It will be noted that the pleated ribbons 60 and 62 may expand in accordion like fashion to accommodate the vertical motion of the cylinder 26.

Due to the use of ribbons 60 and 62 of substantial width considerable rigidity is provided to inhibit relative rotation between bulkhead 36 and the housing 10. This avoids the use of a long keyway which would otherwise have to be provided and which make it difficult to obtain adequate sealing on the sliding surfaces of the cylindrical parts. By use of transparent material for the cylinder 26 it forms not only the enclosing globe for the beacon 38 but provides as well a motor piston and a sealing arrangement to exclude rain and dirt.

While the form of embodiment of the invention as herein disclosed constitutes a preferred form, it is to be understood that other forms might be adopted, all coming within the scope of the claims which follow.

What is claimed is as follows:

1. A power operated disappearing warning lamp for installation in the roof of an emergency vehicle comprising a straight cylindrical housing having an open top and a closed bottom, means at the top of the housing for attachment in an aperture in a vehicle roof and providing an inwardly directed annular shoulder having a circular opening smaller than the inside of the housing, a transparent cylinder slidably mounted in the opening, an annular piston secured to the lower end of the cylinder and engaging the wall of the housing with a sliding fit, a warning light carried within the cylinder, and means for directing the ingress and outflow of fluid to and from the space on at least one side of the piston to selectively move the cylinder between a position concealed below the roof and a position projecting above the roof for warning purposes.

2. A power operated disappearing warning lamp for installation in the roof of an emeregncy vehicle comprising a straight cylindrical housing having an open top and a closed bottom, means at the top of the housing for attachment in an aperture in a vehicle roof, a transparent cylinder slidably mounted within the housing to move between concealed and projecting positions below and above the roof, an imperforate diaphragm sealed in the cylinder, a warning light mounted in the cylinder and fluid operated means for raising and lowering the cylinder.

3. A power operated disappearing warning lamp for installation in the roof of an emergency vehicle comprising a straight cylindrical housing having an open top and a closed bottom, means at the top of the housing for attachment in an aperture in a vehicle roof, a transparent cylinder slidably mounted within the housing to move between concealed and projecting positions below and above the roof, an imperforate diaphragm sealed in the cylinder, a warning light mounted in the cylinder, means for raising and lowering the cylinder and a combined conductor and rotation inhibitor connected between the warning light and the housing.

4. A power operated disappearing warning lamp for installation in the roof of an emergency vehicle comprising a straight cylindrical housing having an open top and a closed bottom, means at the top of the housing for attachment in an aperture in a vehicle roof, a transparent cylinder slidably mounted within the housing to move between concealed and projecting positions below and above the roof, an imperforate diaphragm sealed in the cylinder, a warning light mounted in the cylinder, means for raising and lowering the cylinder and a pleated strip of sheet metal forming a combined conductor and rotation inhibitor connected between the warning light and the housing.

5. A rectractable signal light comprising a rotary light assembly, a transparent vertical cylinder having a closed top and a height corresponding to the height of the light assembly, means for mounting the light assembly within the cylinder, an open-topped vertical cup slidably supporting the cylinder and having a height not substantially greater than the cylinder, and motor means within the housing for shifting the cylinder between a concealed position within the cup and an operating position projected outwardly from the cup.

6. A rectractable signal light comprising a rotary light assembly, a transparent vertical cylinder having a closed top and a height corresponding to the height of the light assembly, means for mounting the light assembly within the cylinder, an open-topped vertical cup slidably supporting the cylinder and having a height not substantially greater than the cylinder, and motor means within the housing for shifting the cylinder between concealed position within the cup and an operating position projected outwardly from the cup, said motor means being of the fluid operated type and utilizing the transparent cylinder as a piston within the cup.

7. A flashing retractable signal light comprising a straight cylindrical housing having an open top and a closed bottom, a transparent cylinder slidably mounted within the housing to move between concealed and projecting positions inside and outside the housing, power operated means within the straight cylindrical housing for elevating and retracting the transparent cylinder, a light source within the transparent cylinder, and means for beaming light from the source in a given direction intermittently only when the transparent cylinder is in the projecting position outside the housing.

References Cited by the Examiner

UNITED STATES PATENTS

| | | | |
|---|---|---|---|
| 282,570 | 8/1883 | Rushforth | 340—136 |
| 1,671,732 | 5/1928 | MacMicking | 340—136 |
| 1,698,966 | 1/1929 | Quick | 340—136 |
| 2,244,983 | 6/1941 | Codde | 340—135 |
| 2,703,875 | 3/1955 | Watanabe et al. | 340—136 |
| 2,843,834 | 7/1958 | Roth et al. | 340—25 |
| 2,843,836 | 7/1958 | McDonald | 340—87 |

OTHER REFERENCES

Publication: Popular Mechanics, vol. 100, Issue No. 6, December 1953.

NEIL C. READ, *Primary Examiner.*

W. C. GLEICHAMAN, T. A. ROBINSON,
*Assistant Examiners.*